United States Patent
Himeno

(10) Patent No.: US 7,346,618 B2
(45) Date of Patent: Mar. 18, 2008

(54) INFORMATION DISTRIBUTION SYSTEM, INFORMATION DISTRIBUTION METHOD, AND INFORMATION CENTER

(75) Inventor: Yasuhiro Himeno, Tokyo (JP)

(73) Assignee: NEC Corporation, Tokyo (JP)

( * ) Notice: Subject to any disclaimer, the term of this patent is extended or adjusted under 35 U.S.C. 154(b) by 483 days.

(21) Appl. No.: 10/294,703

(22) Filed: Nov. 15, 2002

(65) Prior Publication Data

US 2003/0097374 A1 May 22, 2003

(30) Foreign Application Priority Data

Nov. 21, 2001 (JP) ............................. 2001-356051

(51) Int. Cl.
*G06F 17/30* (2006.01)
*G06F 17/00* (2006.01)

(52) U.S. Cl. ..................................... 707/10; 707/104.1

(58) Field of Classification Search .................... 707/1, 707/10, 104.1, 9, 200; 709/203, 201, 217, 709/219

See application file for complete search history.

(56) References Cited

U.S. PATENT DOCUMENTS

| | | | |
|---|---|---|---|
| 6,317,684 B1 | 11/2001 | Roeseler et al. ............. | 701/202 |
| 6,446,130 B1 * | 9/2002 | Grapes ........................ | 709/231 |
| 6,629,136 B1 * | 9/2003 | Naidoo ........................ | 709/219 |
| 7,024,208 B2 * | 4/2006 | Kaise ......................... | 455/456.3 |
| 2001/0016872 A1 | 8/2001 | Kusuda | |
| 2001/0042017 A1 * | 11/2001 | Matsukawa .................. | 705/14 |
| 2002/0004704 A1 * | 1/2002 | Nagatsuma et al. ......... | 701/213 |
| 2002/0029254 A1 * | 3/2002 | Davis et al. ................. | 709/217 |

FOREIGN PATENT DOCUMENTS

| | | |
|---|---|---|
| EP | 1 059 599 A3 | 9/2002 |
| JP | 8-36044 | 2/1996 |
| JP | 10-21263 | 1/1998 |
| JP | 2000-222324 | 8/2000 |
| JP | 2000-231566 | 8/2000 |
| JP | 2001-160063 A | 6/2001 |
| JP | 2001-167032 | 6/2001 |
| JP | 2001-216235 | 8/2001 |
| JP | 2001-297092 | 10/2001 |
| JP | 2001-306604 | 11/2001 |
| JP | 2001-306609 | 11/2001 |
| WO | WO 97/48065 | 12/1997 |
| WO | WO 01/18688 A2 | 3/2001 |
| WO | WO 01/93100 A2 | 12/2001 |
| WO | WO 02/073353 A3 | 9/2002 |
| WO | WO 02/095629 A1 | 11/2002 |

* cited by examiner

*Primary Examiner*—Greta L Robinson
(74) *Attorney, Agent, or Firm*—Foley & Lardner LLP

(57) ABSTRACT

An information distribution system includes an information center and a portable terminal. The portable terminal transmits user's personal information to the information center together with specifying information that specifies the distributed content. The information center registers the received personal information and specifying information in relation to each other. Upon receiving the content distribution request, the information center checks on the basis of the specifying information whether the personal information about the requested distributed content has already been registered. If the personal information has been registered, the information center distributes the personal information to the portable terminal together with the requested content. An information distribution method and a program are also disclosed.

26 Claims, 8 Drawing Sheets

DATABASE 41

| AREA NO. | MAP (Web PAGE) | RELATED INFORMATION (Web PAGE) |
|---|---|---|
| 1 | **** | **** |
|   | **** | **** |
|   | **** | **** |
| 2 | **** | **** |
|   | **** | **** |
|   | **** | **** |
| ⋮ | ⋮ | ⋮ |

FIG. 2A

USER DATABASE 44

| USER ID | SPECIFYING INFORMATION (URL ETC.) | PERSONAL INFORMATION (COMMENT, IMAGE, ETC.) |
|---|---|---|
| **** | **** | **** |
|   | **** | **** |
|   | ⋮ | ⋮ |
| **** | **** | **** |
|   | **** | **** |
|   | ⋮ | ⋮ |
| ⋮ | ⋮ | ⋮ |

FIG. 2B

INFORMATION DISTRIBUTION SYSTEM, INFORMATION DISTRIBUTION METHOD, AND INFORMATION CENTER

BACKGROUND OF THE INVENTION

The present invention relates to an information distribution method and system for distributing information to a portable terminal using the Internet, and an information center that constructs the information distribution system.

In recent years, various kinds of information providing services using the Internet have been proposed. An example of them is a position information service for providing information of the current position and the map around it. In such position information service, a portable terminal is equipped with a function (positioning function) of measuring its current position. An information center formed from a WWW (World Wide Web) server provides to the portable terminal map information that is acquired by the portable terminal in correspondence with the current position.

Portable terminals capable of acquiring their positions include a terminal having a GPS (Global Positioning System) function that is well-known for a car navigation system or the like, and a terminal that specifies its current position on the basis of the position information (latitude and longitude) of a base station that is radio-communicating with the terminal. As terminals of latter type, generally, PHS (Personal Handyphone System) terminals and cell phones are known. The cell phones are poorer in positioning accuracy than PHS.

Recently, an information distribution system which provides not only such a position information service but also simultaneously information related to the provided map has also been proposed, which provides, e.g., town information such as leisure and lodging facilities and restaurants or traffic information such as nearest stations and bus stops. FIG. 9 shows a conventional information distribution system.

The information distribution system shown in FIG. 9 is constituted by a portable terminal 101 having a radio communication function, a base station 102 that communicates with the portable terminal 101 by radio, and an information center 104 connected to the base station 102 through Internet 103. The base station 102 is installed for each predetermined area. The installation location (latitude and longitude) is known in advance.

The portable terminal 101 has a basic arrangement (not shown) comprising a display section formed from an LCD (Liquid Crystal Display), an input section (operation keys), a control section, and a storage section. The portable terminal 101 additionally has a positioning section 101a which corrects a latitude and longitude acquired by the GPS receiving function on the basis of the acquired latitude and longitude of the base station 102, and a browser 101b that is known browsing software. The positioning section 101a has the GPS receiving function and a function of acquiring the information of the latitude and longitude of the base station 102 by communicating with the base station 102 by radio. The storage section stores programs that execute known data processing such as data communication, window display (display of a menu window or reception window (data)), and data input using the operation keys (including selection/input by moving the cursor). These programs are read out and executed by the control section. The positioning section 101a can also be implemented by a program.

The portable terminal 101 can be connected to the Internet 103 through an ISP (Internet Service Provider) server that has a contract with the user in advance. When the control section executes the browser 101b installed in the storage section in advance, the user can browse a desired one of pieces of information that are accessible on the Internet 103. Examples of such portable terminals 101 are a terminal called a browser phone and a PDA (Personal Digital Assistant) that is compatible with PHS and has a browser function.

The information center 104 is an ASP (Application Service Provider) server. This server has a database 104a in which contents such as map information, town information, and traffic information provided on the Internet 103 by other ASP servers (content servers) contracted in advance are registered for each area. The areas are defined by dividing the whole country into a plurality of zones. At least one base station is installed in one area. The information center 104 has an area specifying section 104b which receives portable terminal position information acquired by the positioning section 101a from the portable terminal 101 and then obtains an area corresponding to the current position of the portable terminal 101 from the received portable terminal position information, and a Web page distributing section 104c which reads out, from the database 104a, contents (Web pages) such as map data (Web pages) or related information (town information or traffic information) associated with the obtained area and distributes the contents to the portable terminal 101.

The operation of the conventional information distribution system having the above configuration will be described with reference to FIG. 10. When the user powers on his/her portable terminal 101, a predetermined menu window is displayed on the display section. The menu window contains items relates to the position information service. The user performs input operation by moving the cursor onto an item using the operation keys.

When the input operation is performed, the positioning section 101a of the portable terminal 101 is activated. The positioning section 101a acquires its rough position (latitude and longitude) by the GPS function and requires position information from the base station 102 (step S31). Upon receiving the position information request from the portable terminal 101, the base station 102 transfers its position information (latitude and longitude) to the portable terminal 101 (step S32). On the basis of the thus acquired base station position information, the positioning section 101a corrects its rough position (latitude and longitude) that is acquired early by the GPS function, thereby calculating its accurate position information (portable terminal position information). The portable terminal 101 transmits the portable terminal position information obtained by the positioning function 101a to the information center 104 and requests distribution of contents (step S33).

Upon receiving the content distribution request, the information center 104 requires the portable terminal 101 to transmit a user ID and password, which are registered in advance, to confirm whether the user of the portable terminal is authentic (step S34).

The user ID and password are registered when the user of the portable terminal 101 has done use registration in the information distribution system. The user ID is registered in accordance with, e.g., the following procedure. First, the user accesses a Web page of registration, which is made accessible on the Internet 103 by the information center 104, using his/her portable terminal 101. The user inputs necessary information (mail address and the like) on the Web page and requests issue of an ID. In response to the ID issue request, the information center 104 first transmits e-mail to the user to confirm that, e.g., "the registration information has been transmitted from the user, and if he/she will register himself/herself, he/she must access a URL (Uniform Resource Locators) for registration". The user accesses the registration URL received from the information center 104 using the portable terminal 101 and registers the user ID and password there.

In response to the user ID & password transmission request, the portable terminal 101 transmits the user ID and password input by the user to the information center 104 (step S35). The information center 104 checks whether the user ID and password received from the portable terminal 101 are registered in the authentication database created when the user ID and password are registered. Only when they are registered, the information center 104 executes content distribution (to be described later). If the user ID and password are not registered, the information center 104 transmits a message representing it to the portable terminal 101. The information center 104 may transmit to the portable terminal 101 a message to prompt the user to register the user ID and password.

When it is determined that the user is an authentic user, the area specifying section 104b in the information center 104 obtains an area corresponding to the current position of the portable terminal 101 on the basis of the portable terminal position information received from the portable terminal 101. In addition, the Web page distributing section 104c transmits to the portable terminal 101 the list information (including the URL information of contents) of contents such as map data (Web pages), town information, and traffic information related to the obtained area (step S36).

When the portable terminal 101 receives the content list information from the information center 104, the browser 101b is activated to display the received content list information on the display section. When the user performs input operation by moving the cursor onto a desired item of the content list information using the operation keys, the browser 101b accesses the URL of the content selected and input by the cursor. With this access, a content request is sent from the portable terminal 101 to the information center 104 through the Internet 103 (step S37).

Upon receiving the content request from the portable terminal 101, the Web page distributing section 104c in the information center 104 reads out the Web page of the requested content from the database 104a and transmits the Web page to the portable terminal 101 (step S38). In the portable terminal 101, the content (Web page) received from the information center 104 is displayed on the display section.

By repeating the processes in steps S37 and S38, the user can browse various contents (Web pages).

According to the above-described conventional information distribution system, the area is automatically narrowed down in accordance with the current position information of the portable terminal 101, and map data and town information related to that area are provided. For this reason, the operability in receiving the position information service increases, and the user can easily acquire a wealth of information.

However, the conventional information distribution system described above has the following problems.

The map data provided to the portable terminal 101 is generally simple, and no detailed information is displayed. For this reason, if the way to the destination is complex, it is difficult to find the way to the destination only on the map data provided to the portable terminal 101. Additionally, when the user has managed to arrive at the destination by the complex route, he/she may want to make a note about the complex route so that he/she can refer to both the map data and the note for the next visit. For town information, the user may also want to make a note of his/her comments about, e.g., a restaurant in association with the town information. However, the conventional information distribution system has no function of storing such notes in the system. Hence, the user must make notes by writing them in a note pad (notebook). The convenience is by no means high.

Japanese Patent Laid-Open No. 2001-160063 (reference 1) has proposed a system which stores a note related to provided information (homepage itself or URL) in a storage section in a portable terminal. The portable map display apparatus proposed in reference 1 can store a comment using an electronic address function that is prepared in the apparatus in advance. However, since the portable terminal must be compact and inexpensive, a large storage capacity is not preferable. Hence, storing a note on the portable terminal side is inconsistent with the demands for size and cost reduction of portable terminals.

SUMMARY OF THE INVENTION

It is an object of the present invention to provide an information distribution system, information distribution method, and information center which can conveniently store personal information such as comments and images in association with provided contents.

It is another object of the present invention to provide an information distribution system, information distribution method, and information center which do not impede size and cost reduction of portable terminals.

In order to achieve the above objects, according to the present invention, there is provided an information distribution system comprising an information center in which a plurality of contents are registered in advance, and a portable terminal connected to the information center through a network, the information center distributing a requested content to the portable terminal in response to a content distribution request from the portable terminal, wherein the portable terminal transmits to the information center personal information of a user, which is input in association with the content distributed from the information center, together with specifying information that specifies the distributed content, and the information center registers the received personal information and specifying information in relation to each other, upon receiving the content distribution request from the portable terminal, checks on the basis of the specifying information whether the personal information about the requested distributed content has already been registered, and if the personal information has been registered, distributes the personal information to the portable terminal together with the requested content.

BRIEF DESCRIPTION OF THE DRAWINGS

FIG. 2A is a view showing a registration example in a database shown in FIG. 1;

FIG. 2B is a view showing a registration example in a user database shown in FIG. 1;

DESCRIPTION OF THE PREFERRED EMBODIMENTS

The present invention will be described below in detail with reference to the accompanying drawings.

Figure 1:
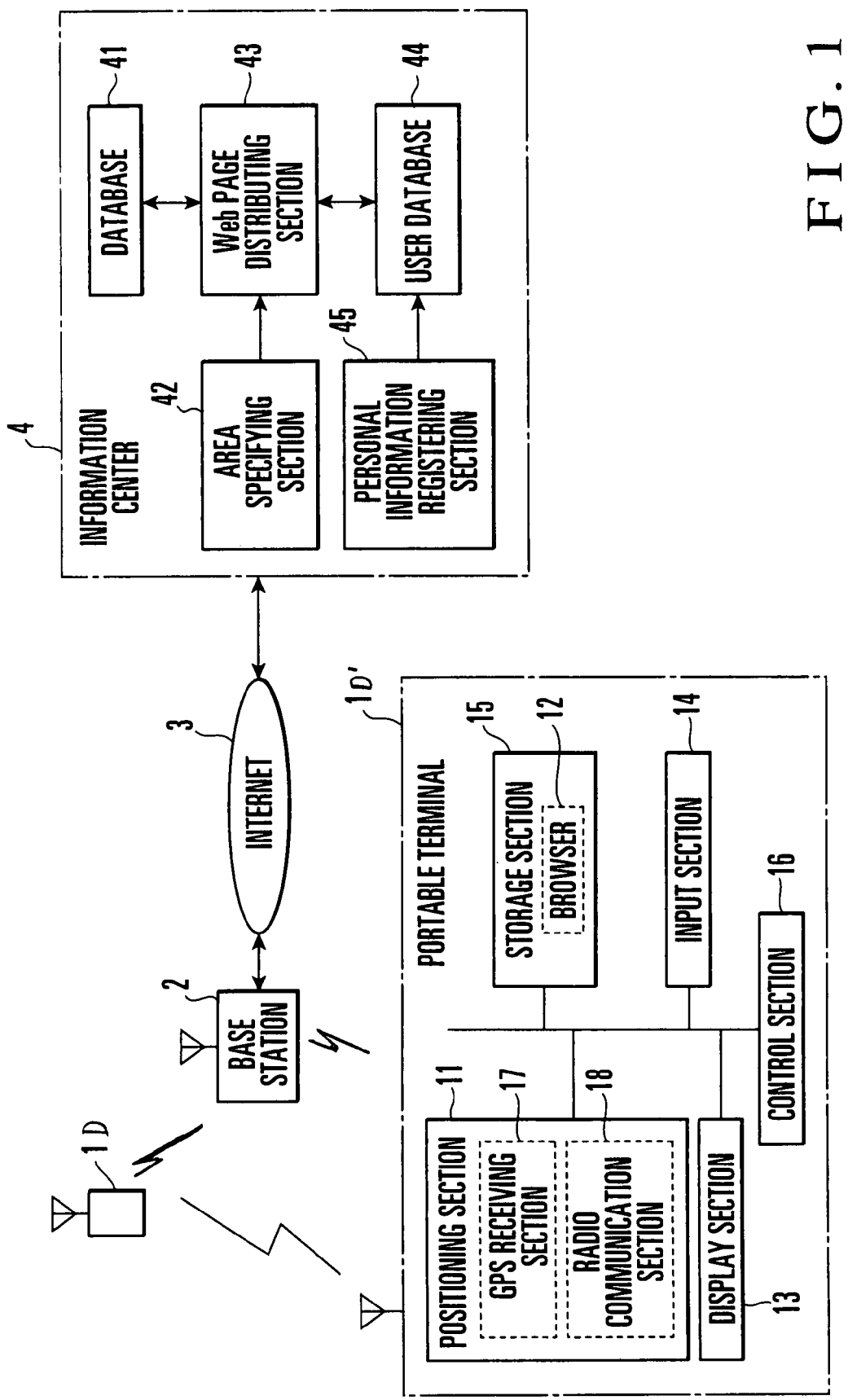
FIG. 1 is a block diagram showing the schematic configuration of an information distribution system according to the first embodiment of the present invention.

FIG. 1 shows the schematic configuration of an information distribution system according to the first embodiment of the present invention. The information distribution system of this embodiment is constituted by a plurality of portable terminals 1D, 1D' (hereinafter referred to with a "1" label, for sake of brevity) each having a radio communication function, a base station 2 which communicates with the portable terminals 1 by radio, and an information center 4 connected to the base station 2 through Internet 3.

Each of the portable terminals 1 has a positioning section 11 which corrects a latitude and longitude acquired by the GPS receiving function on the basis of the latitude and longitude of the base station 2 and specifies the position of the portable terminal 1, and a browser 12 that is known browsing software. A plurality of base stations 2 are installed for each predetermined service area. The latitude and longitude of each installation location are known in advance.

The portable terminal 1 has a basic arrangement comprising, in addition to the positioning section 11 and browser 12, a display section 13 formed from an LCD, an input section (operation keys) 14, a storage section 15 in which various programs including the browser 12 are stored in advance, and a control section 16. The positioning section 11 has a GPS receiving section 17 which receives a GPS signal from a GPS satellite (not shown) and outputs position information, and a radio communication section 18 which acquires information of the latitude and longitude of the base station 2 by radio communication with the base station 2. The storage section 15 stores programs that execute known data processing such as data communication, window display (display of a menu window or reception window (data)), and data input using the operation keys (including selection/input by moving the cursor). These programs are read out and executed by the control section 16. The function of the positioning section 11 can also be implemented by a program.

The portable terminal 1 can be connected to the Internet 3 through an ISP (Internet Service Provider) server that has a contract with the user in advance. When the control section 16 executes the browser 12 installed in the storage section 15 in advance, the user can browse a desired one of pieces of information that are accessible on the Internet 3.

The information center 4 has a database 41, area specifying section 42, Web page distributing section 43, user database 44, and personal information registering section 45. In the database 41, contents such as map information, town information, and traffic information provided on the Internet 3 by other ASP servers (content servers) contracted in advance are registered for each area. The area specifying section 42 receives portable terminal position information acquired by the positioning section 11 from the portable terminal 1 and then obtains an area corresponding to the current position of the portable terminal 1 from the received portable terminal position information. The Web page distributing section 43 reads out, from the database 41, contents (Web pages) such as map data or related information (town information or traffic information) associated with the obtained area and distributes the contents to the portable terminal 1.

In the user database 44, pieces of personal information such as user's comments (audio information or character information) or image information are registered for each user. The personal information registering section 45 registers personal information sent from the portable terminal 1 in the user database 44. Personal information is registered in the user database 44 in association with contents (Web pages) registered in the database 41 in correspondence with each area.

As shown in FIG. 2A, map data (Web pages) and related information (Web pages) corresponding to each area are registered in the database 41. In the user database 44, items corresponding to each related information registered in the database 41 can be set for each user ID, as shown in FIG. 2B. Personal information (comment or image data) can be registered for each set item.

The user ID is issued when the user of the portable terminal 1 has done use registration in the information distribution system. To connect the portable terminal to the information distribution system, the user must input the user ID on the portable terminal 1 using the operation keys. The user ID is registered in the information distribution system in accordance with the same procedure as in the conventional system. Normally, a password is also registered simultaneously with user ID registration.

The operation of the information distribution system having the above configuration will be described next with reference to FIG. 3. When the user powers on his/her portable terminal 1, a predetermined menu window is displayed on the display section 13. The menu window contains items relates to the position information service. The user performs input operation by moving the cursor onto an item using the operation keys 14.

The positioning section 11 of the portable terminal 1 is activated by the user's input operation. The GPS receiving section 17 acquires its rough position (latitude and longitude). Simultaneously, the portable terminal 1 requires position information from the base station 2 through the radio communication section 18 (step S1). Upon receiving the position information request from the portable terminal 1, the base station 2 transfers its position information (latitude and longitude) to the portable terminal 1 (step S2). On the basis of the thus acquired base station position information, the positioning section 11 corrects its rough position (latitude and longitude) that is acquired early by the GPS receiving section 17, thereby calculating its accurate position information (portable terminal position information). The portable terminal 101 transmits the portable terminal position information obtained by the positioning section 11 to the information center 4 and requests distribution of contents (step S3).

Upon receiving the content distribution request, the information center 4 requires the portable terminal 1 to transmit a user ID and password, which are registered in advance, to confirm whether the user of the portable terminal is authentic (step S4).

In response to the user ID & password transmission request, the user inputs from the input window the user ID and password registered in advance, thereby transmitting them to the information center 4 (step S5). The information center 4 checks whether the user ID and password received from the portable terminal 1 are registered in the authentication database. Only when they are registered, the information center 4 executes content distribution (to be described later). If the user ID and password are not registered, the information center 4 transmits a message representing it to the portable terminal 1. The information center 4 may transmit to the portable terminal 1 a message to prompt the user to register the user ID and password.

When it is, determined that the user is an authentic user, the area specifying section 42 in the information center 4 obtains an area corresponding to the current position of the portable terminal 1 on the basis of the portable terminal position information received from the portable terminal 1. In addition, the Web page distributing section 43 transmits to the portable terminal 1 the list information (including the URL information of contents) of contents such as map data (Web pages), town information, and traffic information related to the obtained area (step S6).

When the portable terminal 1 receives the content list information from the information center 4, the browser 12 is activated to display the received content list information on the display section 13. When the user performs input operation by moving the cursor onto a desired item of the content list information using the operation keys 14, the browser 12 accesses the URL of the content selected by the cursor. With this access, a content request is sent from the portable terminal 1 to the information center 4 through the Internet 3 (step S7).

Upon receiving the content request from the portable terminal 1, the Web page distributing section 43 in the information center 4 reads out the Web page of the requested content from the database 41 and transmits the Web page to the portable terminal 1 (step S8). In the portable terminal 1, the content (Web page) received from the information center 4 is displayed on the display section 13.

The above processing is almost the same as in the above-described conventional system. In the system of this embodiment, personal information such as user's comment or image information about the displayed content (Web page) can be registered in the information center 4. The personal information can be referred to at the next access to the same content (Web page).

A procedure of registering a comment in the information center 4 will be described next. To store a comment or image data about the content (Web page) displayed on the display section 13 of the portable terminal 1, the user inputs an instruction. Normally, a pointer input button is prepared at a portion of the displayed content (Web page). When input operation is performed by moving the cursor onto the button, the window changes to a comment input window. On the displayed comment input window, the user writes a comment about the content (Web page) displayed on the preceding window using the operation keys 14 (step S9).

The portable terminal 1 has a function of editing the input comment. The user can freely edit the input comment. To input image data as personal information, the portable terminal 1 only needs to have a CCD camera and a storage section which stores image data (still or moving image) sensed by the CCD camera. In this case, the user can take a desired image using the CCD camera. On the other hand, to input a comment as audio data, the portable terminal 1 must only have a microphone and a storage section which stores audio data input from the microphone. In this case, the user can freely input a comment by voice through the microphone.

After a comment (or image) is input, the user inputs on the portable terminal 1 an instruction to transmit the input comment (or image) to the information center 4. Then, the portable terminal 1 transmits information (e.g., URL) that specifies the displayed content (Web page) and the input comment (or image) to the information center 4 (step S10). Normally, a pointer input button is prepared at a portion of the comment input window. When input operation is performed by moving the cursor onto the button, the comment is transmitted.

When the information center 4 receives the content (Web page) specifying information and input comment from the portable terminal 1, the personal information registering section 45 registers the received content (Web page) specifying information and input comment in the user database 44 in association with the user ID received together with the portable terminal position information, as shown in FIG. 2B. If it is the first registration for the user ID, the personal information registering section 45 prepares a user ID column on the user database 44 and registers the received content (Web page) specifying information and input comment in the set user ID column.

On the other hand, if a user ID column has already been set, other content (Web page) specifying information and input comments have already been registered therein, and the received content (Web page) specifying information is not registered yet, the received content (Web page) specifying information and input comment are registered in the already set column. When any other comment has already been registered in association with the received content (Web page) specifying information, the received input comment is additionally registered. When comment registration is ended, the information center 4 transmits a notification (comment registration end notification) representing it to the portable terminal 1 (step S11).

A procedure of referring to the comment registered in the information center 4 will be described next with reference to FIG. 4. After steps S1 to S7 in FIG. 3 described above, the information center 4 receives a request for a content K from the portable terminal 1 (step S21). The Web page distributing section 43 reads out the requested content K (Web page) from the database 41 and checks on the basis of specifying information whether the user database 44 has a comment about the readout content K (Web page) (step S22 in FIG. 4).

If NO in step S22, the Web page distributing section 43 transmits only the content K (Web page) to the portable terminal 1. To register a comment about the transmitted content K (Web page), steps S9 to S11 in FIG. 3 described above are executed.

If YES in step S22, the Web page distributing section 43 reads out the comment from the user database 44 and transmits it to the portable terminal 1 together with the content K (Web page). In the portable terminal 1, the content K (Web page) and comment received from the information center 4 are displayed on the display section, as shown in FIG. 5 or 6.

Figure 5:
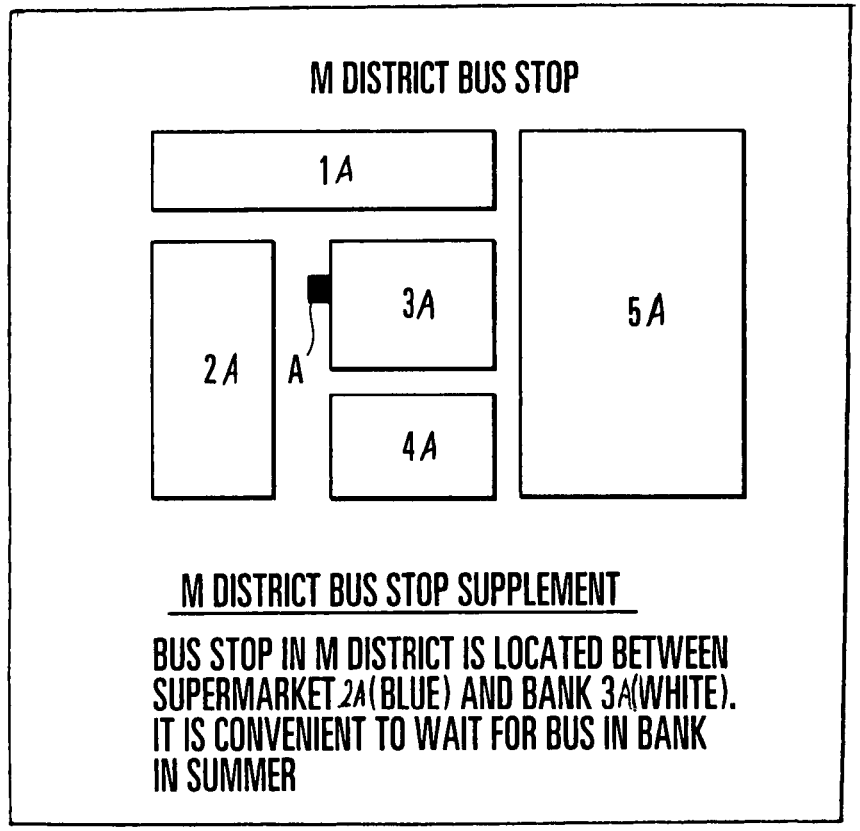
FIG. 5 is a view showing an example of the display window of a content distributed by the information center shown in FIG. 1.

In the example shown in FIG. 5, M district bus stop information containing a bus stop A is displayed as the content K, and an M district bus stop supplement is displayed as a comment. As the M district bus stop information, buildings "1A" to "5A" are displayed as blocks. The target bus stop A is displayed adjacent to building "3A". The M district bus stop supplement has a comment: "Bus stop in M district is located between supermarket 2A (blue) and bank 3A (white). It is convenient to wait for a bus in the bank in summer". The user can easily find the bus stop A by referring to the displayed comment and wait for a bus in the bank (building "3A").

Figure 6:
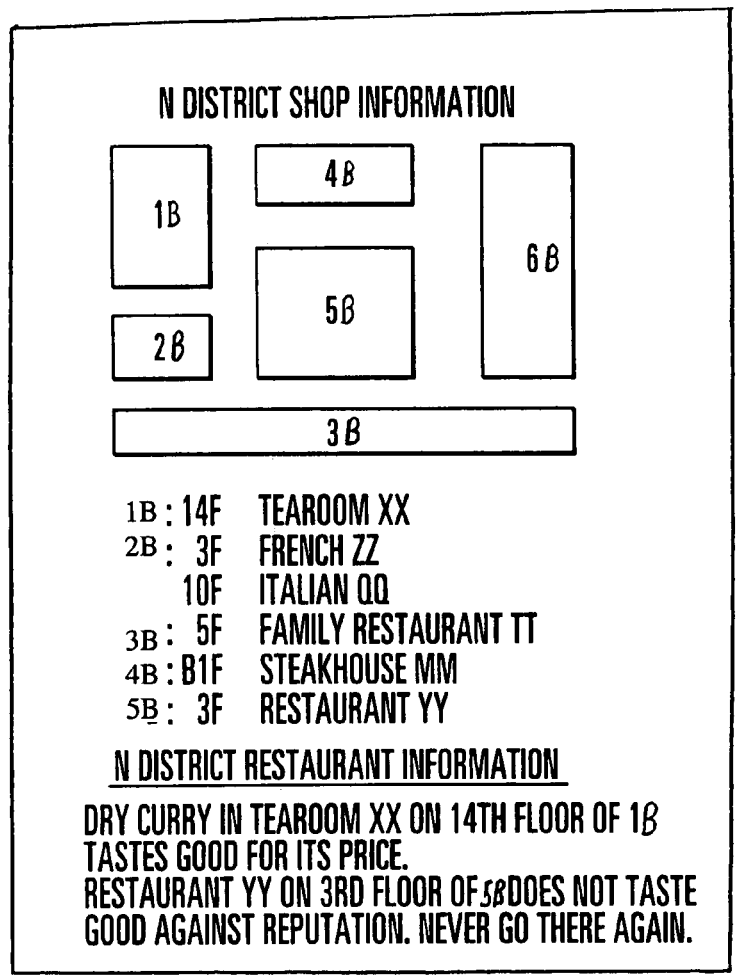
FIG. 6 is a view showing another example of the display window of the content distributed by the information center shown in FIG. 1.

In the example shown in FIG. 6, N district shop information is displayed as the content K, and N district restaurant information is displayed as a comment. As the N district shop information, buildings "1B" to "6B" are displayed as blocks with descriptions "1B: 14F tearoom XX", "2B: 3F French ZZ, 10F Italian QQ", "3B: 5F family restaurant TT", "4B: B1F steakhouse MM", and "5B: 3F restaurant YY". The N district restaurant information has a comment: "Dry curry in tearoom XX on 14th floor of 1B tastes good for its price. Restaurant YY on 3rd floor of 5B does not taste good against reputation. Never go there again". The user who will take a meal in the N district can find a restaurant to his/her taste by referring to the displayed comment.

Figure 3:
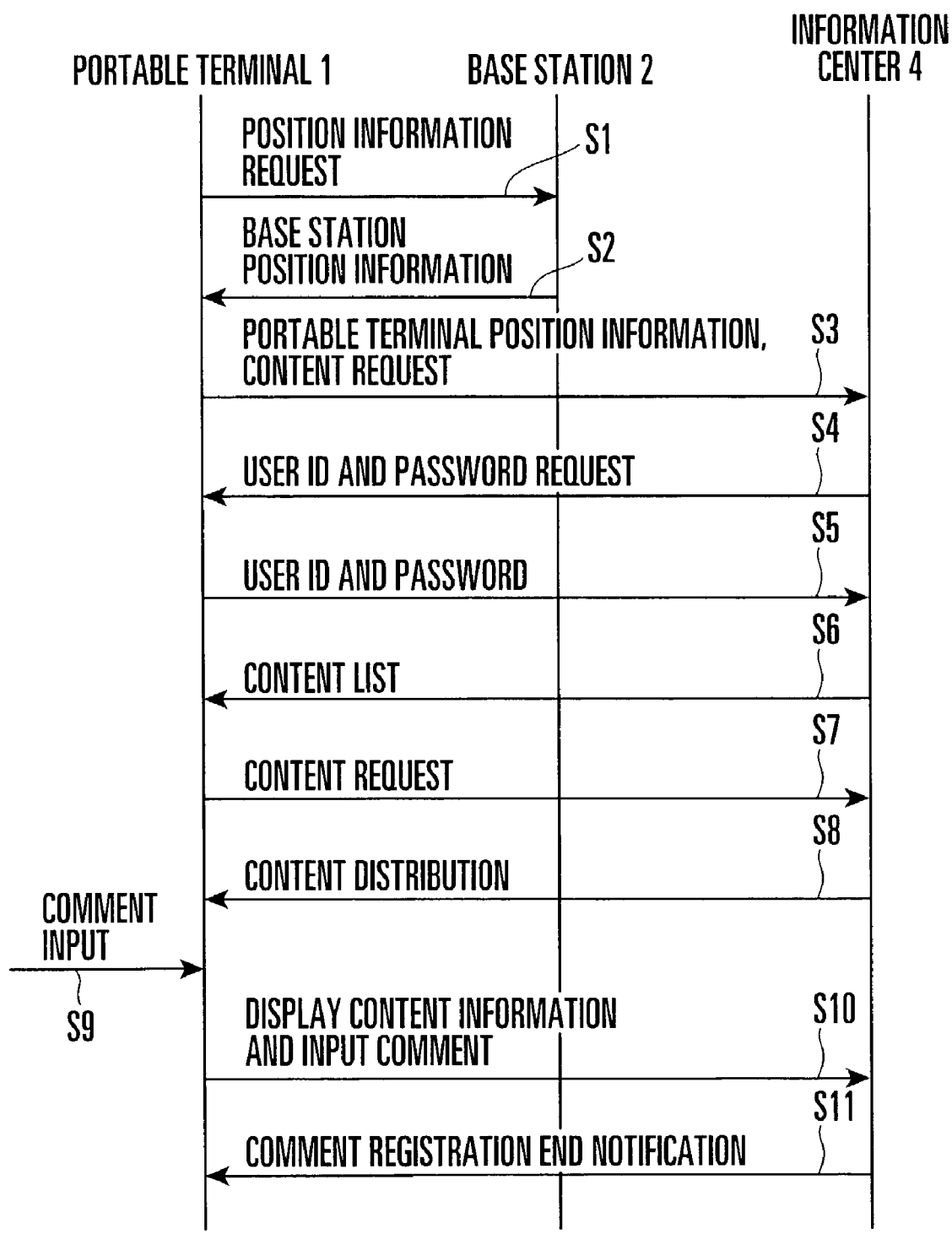
FIG. 3 is a chart for explaining the operation procedure of the information distribution system shown in FIG. 1.
Figure 4:
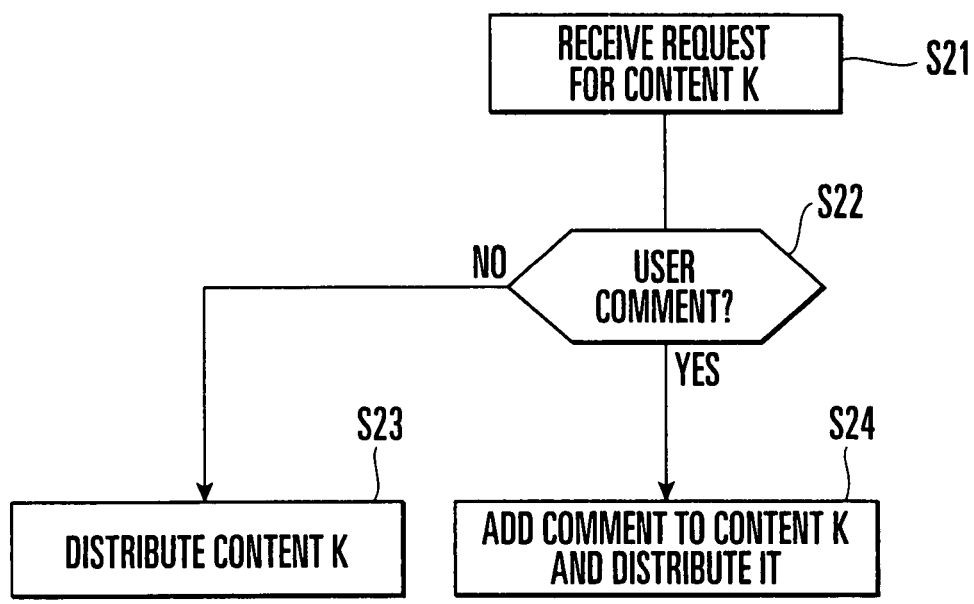
FIG. 4 is a flow chart for explaining the comment reference operation by an information center shown in FIG. 1.

To register a new comment about the content K (Web page) displayed in the above way, steps S9 to S11 in FIG. 3 described above are executed. At this time, comments that have already been registered may be edited by adding, correcting, or deleting them.

According to this embodiment, when the user has missed his/her way at a crossroad or the like, he/she can add an image or comment about that place to the map data (content) displayed on the portable terminal 1 so that he/she never get trouble again. Hence, the user can easily find the destination and largely shorten the total distance to the destination.

Figure 7:
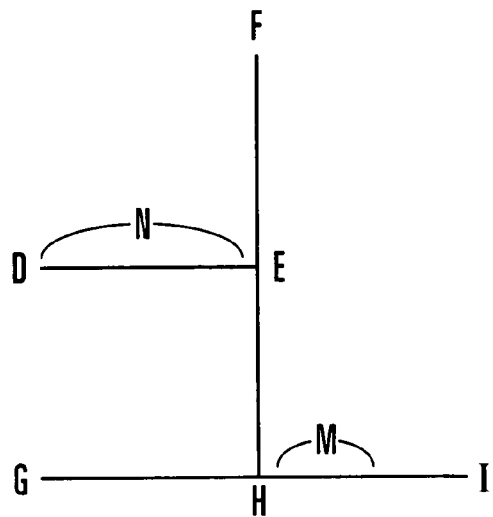
FIG. 7 is a view for explaining how to shorten the total distance to the destination by using the information distribution system shown in FIG. 1.

How to largely shorten the total distance to the destination by using the above-described system will be described next with reference to FIG. 7. FIG. 7 schematically shows a route network having two junctions of three roads, including a road from a point D to a point E, a road from the point E to a point F, a road from the point E to a point H, a road from the point H to a point G, and a road from the point H to a point I. Assume that all the roads have the same length N (N>0), and the user cannot know whether a course is right until he/she goes a distance M (M>0) from a junction. The total distance from the point D to the point I will be examined.

When the user will go from the point D to the point I, he/she can obtain the shortest course by selecting the road from the point E to the point H and the road from the point H to the point I. The total distance is 3N. This shortest course is selected at a probability of $\frac{1}{4}(=\frac{1}{2}\times\frac{1}{2})$. Assume that the user selects the road from the point E to the point F by mistake, goes and returns the distance M, and properly selects the road from the point H to the point I. In this case, since the user selects the wrong course once, the total distance is (3N+2M). In addition, assume that the user properly selects the road from the point E to the point H, selects the road from the point H to the point G by mistake, and goes and returns the distance M. In this case as well, the total distance is (3N+2M).

Furthermore, assume that the user selects the road from the point E to the point F by mistake, goes and returns the distance M, selects the road from the point H to the point G, too, by mistake, and goes and returns the distance M again. In this case, since the user selects the wrong courses twice, the total distance is (3N+4M) (longest course), i.e., longer than any of the above courses.

In the information distribution system of this embodiment, the shortest course can be selected on the basis of a comment on the map data (content), except the first visit to the destination. Hence, the total distance to the destination is 3N. If no comment is present, the user will go an average distance given by $$\{3N+(3N+2M)\times 2+(3N+4M)\}/4=3N+2M$$

If N=M, the distance changes by 40% (=(5N−3N)/5N× 100%).

In addition, according to this embodiment, to refer to town information (content) on the portable terminal 1, the user can visit a good restaurant again or avoid visit to a bad restaurant by referring to comments. Let R (R>2) be the number of shops in a given area, and S (S>1) be the number of shops that have satisfied the user. When the user adds comments about shops that have satisfied him/her (e.g., good restaurants) for the first time, the use probability of the shops that have satisfied the user is "1". On the other hand, when no comments are added, the use probability is S/R.

In addition, let T (T>1) be the number of shops that have disappointed the user. When the user adds comments for the first time, the user uses the shops that have disappointed him/her at a probability of (T−1)/(R−1). On the other hand, when no comments are added, the use probability is T/R. When comments are added, the user selects shops that have disappointed him/her at a lower probability because ((T−1)/(R−1))<(T/R).

In the information distribution system according to the above-described embodiment, the positioning section 11 of the portable terminal 1 specifies the accurate current position of the portable terminal 1 by correcting the latitude and longitude acquired by the GPS receiving section 17 on the basis of the base station information (latitude and longitude) from the base station 2, like differential GPS (DGPS). However, since the information center 4 provides a content for each area, the accurate current position (latitude and longitude) of the portable terminal 1 need not be known. It is only necessary to specify the area where the portable terminal 1 is located. Hence, the positioning section 11 of the portable terminal 1 need not always have the GPS receiving section 17.

In this case, the radio communication section 18 acquires base station position information from the base station 2. The acquired base station position information is transmitted to the information center 4 through the radio communication section 18 as portable terminal position information. The information center 4 specifies the area on the basis of the received base station position information. Alternatively, the portable terminal 1 may transmit the latitude and longitude acquired by the GPS receiving section 17 of the positioning section 11 to the information center 4, and the information center 4 may specify the area on the basis of the received latitude and longitude.

To handle user's personal information, an advanced security system is preferably provided. Generally, a security system using passwords is employed. To implement a more advanced security system, an authentication system using biometrics (biometrical information) is employed. Authentication systems using biometrics include systems using fingerprints, voiceprints, irises, and personal facial images. A system that employs fingerprint authentication will be described below.

Figure 8:
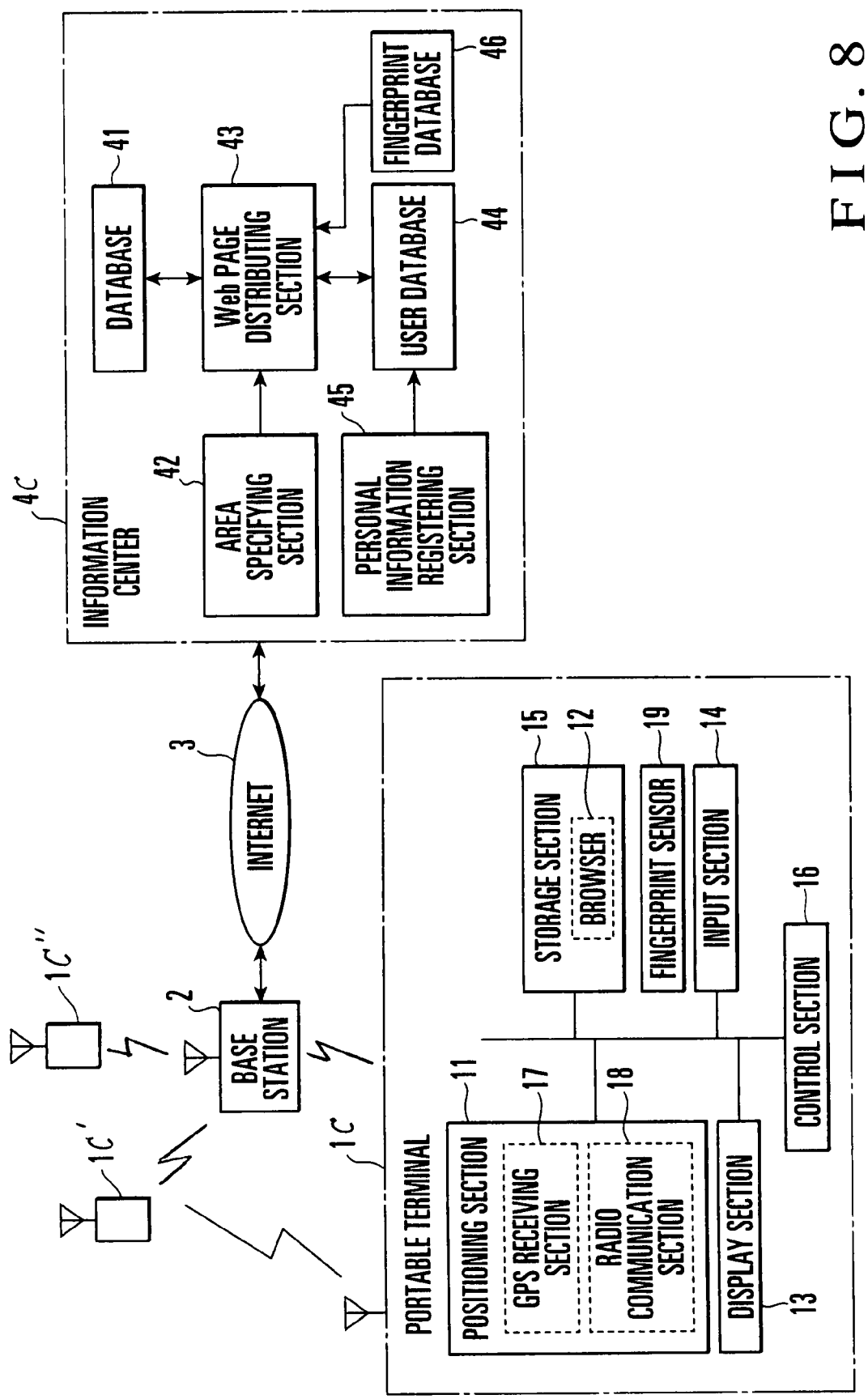
FIG. 8 is a block diagram showing the schematic configuration of an information distribution system according to the second embodiment of the present invention.
Figure 9:
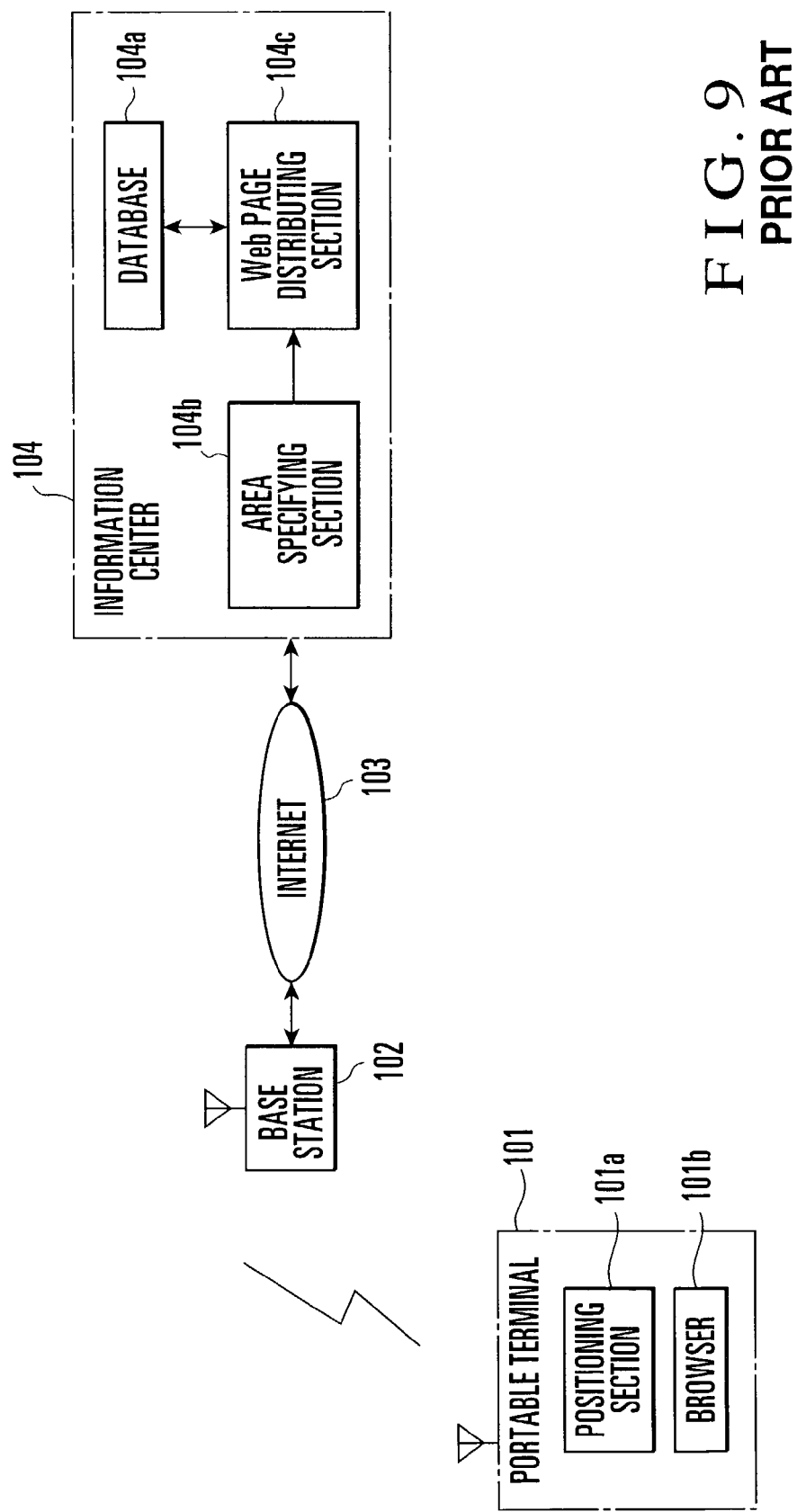
FIG. 9 is a block diagram of a conventional information distribution system.
Figure 10:
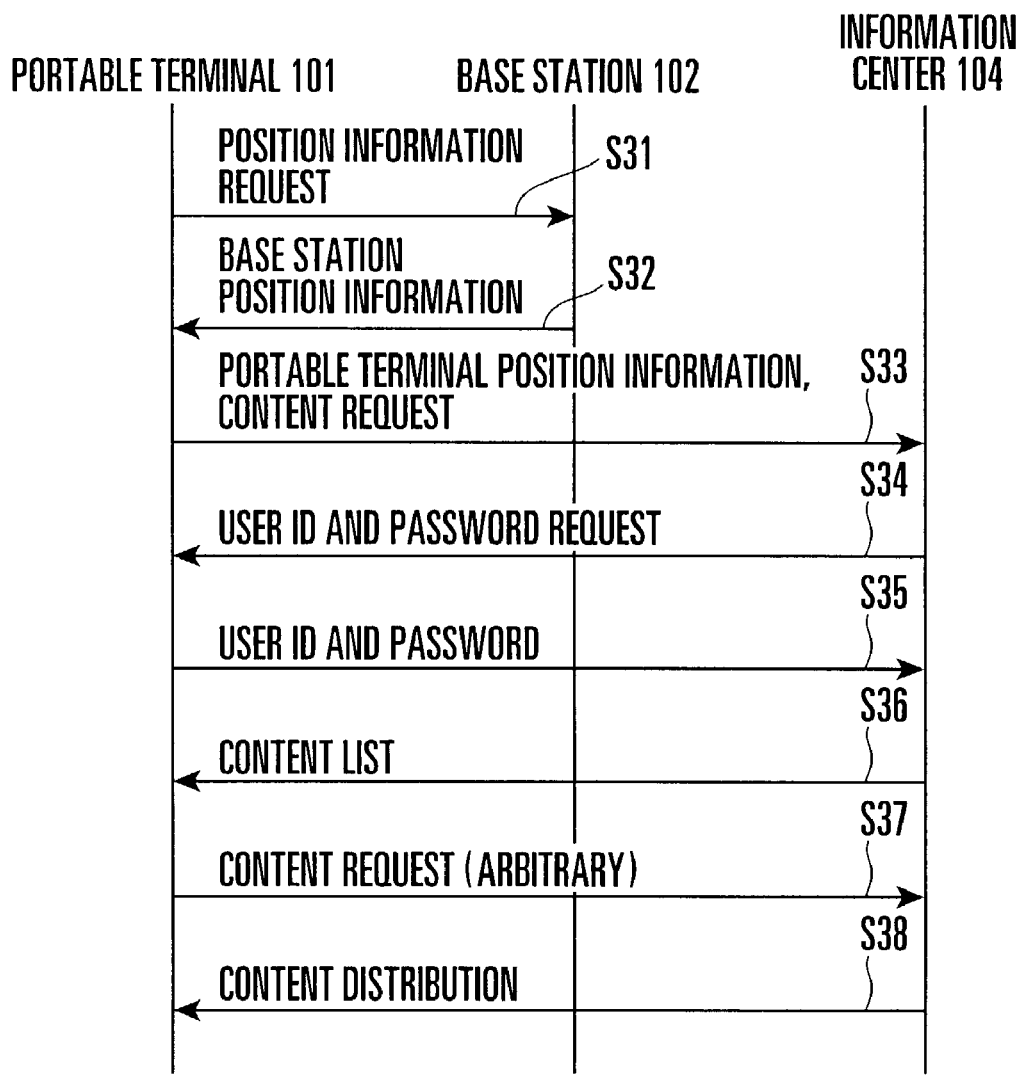
FIG. 10 is a chart for explaining the operation procedure of the conventional information distribution system shown in FIG. 9.

FIG. 8 shows an information distribution system according to the second embodiment of the present invention. In this embodiment, a portable terminal 1C, 1C', 1C" (hereinafter referred to with a "1" label, for sake of brevity) includes all of the features shown in FIG. 1, along with a fingerprint sensor 19 for inputting user's fingerprint. In addition, an information center 4 shown in FIG. 1 has a fingerprint database 46 in which user's fingerprints are registered in advance. Fingerprint information is preferably registered in the fingerprint database 46 simultaneously with user ID registration. For use, the portable terminal 1 requests the user to input his/her fingerprint and transmits the user's fingerprint data input from the fingerprint sensor 19 to the information center 4. The information center 4 checks whether the fingerprint data received from the portable terminal 1 matches fingerprint information registered in the fingerprint database 46, thereby executing authentication.

In the information distribution system shown in FIG. 1 or 8, the portable terminal 1, 1C and information center 4, 4C are formed from computer systems each comprising a storage device which stores programs and the like, an input device such as a keyboard or mouse, a display device such as a CRT or LCD, a communication device such as a modem that communicates with an external device, an output device such as a printer, and a control device which receives inputs from the input device and controls the operations of the control device, output device, and display device. All the above-described processing operations, including the processing for inputting/registering personal information such as a comment or image and authentication processing, can easily be realized by programs.

In the information distribution system according to the first embodiment, contents registered in the database 41 of the information center 4 are information which are made accessible on the Internet 3 by the content servers of content providers. The content providers can freely update (e.g., introduce new merchandise items) or move (change the URLs of homepages) information on their content servers. When information has been updated or moved, the information center 4 preferably notifies the user of the portable terminal 1 that the content has been updated or moved.

A procedure of notifying a user that a content has been updated or moved will be described below as the third embodiment of the present invention. As the system configuration, that shown in FIG. 1 is used. Only the operation procedure will be described.

When a content provider has updated information accessible on the Internet 3, he/she transmits a content update notification from his/her content server to an information center 4. The information center 4 updates corresponding content information registered in a database 41 on the basis of the content update information received from the content server.

When a portable terminal 1 requests content distribution in an area where the updated content is registered, the information center 4 transmits to the portable terminal 1 update information about the updated content together with a content list registered for that area. In the portable terminal 1, the content list and content update information received from the information center 4 are displayed. For example, when the content list with comments added before includes a content related to N district shop information (FIG. 6), and that content has been updated, content update information related to the N district shop information is displayed next to display of the items of the content list. The user of the portable terminal 1 can know that the content has been updated from the displayed content update information.

The content update information is displayed together with the content list. When a plurality of contents in the content list have been updated, pieces of content update information related to the plurality of updated contents are simultaneously displayed. In this case, these pieces of content update information are very illegible. Hence, content update information may be displayed when a corresponding content item is selected and input. Such hierarchical display (first display) of update information and simultaneous display (second display) of update information on the content list window can arbitrarily be switched by the user on the portable terminal 1. More specifically, a button that switches between the first display and the second display is prepared at a portion of the display window. The user selects the first or second display by using the displayed switching button.

When the content provider has updated the URL of information (homepage) accessible on the Internet 3, he/she transmits an update notification (URL movement information) from his/her content server to the information center 4. The information center 4 updates corresponding content information registered in the database 41 on the basis of the URL movement information received from the content server.

When the portable terminal 1 requests content distribution in an area where the content with the moved URL is registered, the information center 4 transmits to the portable terminal 1 URL movement information about the content with the moved URL together with a content list registered for that area. In the portable terminal 1, the content list and URL movement information received from the information center 4 are displayed. The user of the portable terminal 1 can know that the URL of the corresponding content has been moved from the displayed URL movement information.

For display of the URL movement information as well, hierarchical display (first display) and simultaneous display (second display) on the content list window can be switched, like display of content update information.

In accordance with the above-described display of URL movement information, the information center 4 can move or delete personal information (comment or image) about the corresponding content in the following way. First, when the user selects and inputs an item corresponding to the displayed URL movement information from the content list on the portable terminal 1, the portable terminal 1 requests the information center 4 to distribute the selected and input content (step S7 in FIG. 3).

Upon receiving the content distribution request, the information center 4 checks whether the portable terminal 1 that has sent the content distribution request has added a comment to the content with the moved URL in the transmitted content list. More specifically, on the basis of the user ID acquired from the portable terminal 1 when it has requested the content (step S5 in FIG. 3), the information center 4 checks specific information having personal information related to the user ID in a user database 44. Next, the information center 4 checks whether the checked specific information contains information related to the previous URL of the content with the moved URL. With this processing, the information center 4 determines whether a comment about the content with the moved URL has been moved is present.

If a comment about the content with the moved URL is present, the information center 4 transmits to the portable terminal 1 information representing that the personal information previously added to the content before URL movement is present together with the requested content. When no comment is present, only the requested content is distributed.

In the portable terminal 1, the content and the information representing the presence of personal information, which are received from the information center 4, are displayed. At this time, a button for moving or deleting personal information is displayed at a portion of the window. When the user selects and inputs the displayed button on the window, the window changes to a window for personal information movement or delete. On the displayed window, the user moves the personal information to the content with the moved URL or inputs information necessary for deleting the personal information.

When an instruction for moving the personal information to the content with the moved URL is input, the portable terminal 1 transmits a request for it to the information center 4. The information center 4 rewrites the specifying information of the corresponding personal information in the database 41 to the moved URL. On the other hand, when an instruction for deleting the personal information is input, the portable terminal 1 transmits a request for it to the information center 4. In response to the request, the information center 4 deletes the corresponding personal information and information related to it from the database 41.

As has been described above, according to the present invention, the user can freely add personal information such as a comment (audio information or character information) or image information to a content (content (Web page) such as map data or town information) provided from the information center on the portable terminal. Since the personal information is stored and kept on the information center (server) side, the storage capacity of the portable terminal need not be increased, unlike the conventional system. When the user requests the same content again, the personal information stored and kept on the information center (server) side is provided together with the requested content. Hence, for example, even when the way to a destination is complex, and it is difficult to find the way to the destination only on provided map data, the user can easily find the way to the destination by referring to the personal information.

What is claimed is:

1. An information distribution system comprising:
   an information center in which a plurality of contents are registered in advance; and
   a portable terminal connected to said information center through a network,
   said information center distributing a requested content to said portable terminal in response to a content distribution request from said portable terminal, the requested content corresponding to one or more URLs of a respective one or more Internet web sites accessible by said information center,
   wherein said portable terminal transmits to said information center personal information of a user, which is input in association with the content distributed from said information center, together with specifying information that specifies the distributed content, the specifying information corresponding to a specific one of the one or more URLs of a specific one of the one or more Internet web sites for which the personal information is pertinent to, and
   said information center registers the received personal information and specifying information in relation to each other, upon receiving the content distribution request from said portable terminal, checks on the basis of the specifying information whether the personal information about the requested distributed content has already been registered, and if the personal information has been registered, distributes the personal information to said portable terminal together with the requested content, and
   wherein the received personal information is only provided by said information center to said portable terminal that supplied said personal information, when said portable terminal later accesses the specific one of the one or more URLs, and wherein the received personal information provided by said portable terminal to said information center is not provided to other portable terminals that are capable of accessing said information center,
   wherein both a content list and content update information that includes said personal information related to one or more items of the content list are simultaneously displayed on a display of the portable terminal, upon selection of the one or more items of the content list by the user.

2. A system according to claim 1, wherein
   said portable terminal comprises:
   position information acquisition means for acquiring a current position, and
   radio communication means for transmitting the current position information acquired by said position information acquisition means to said information center and sending the content distribution request,
   said information center comprises:
   a first database in which a plurality of contents are registered for each of a plurality of areas which are defined by dividing a predetermined region,
   area specifying means for specifying an area where said portable terminal is currently located from the plurality of areas on the basis of the current position information provided from said portable terminal,
   content distribution means for reading out a list of contents related to the area specified by said area specifying means from said first database and transmitting the list to said portable terminal, and reading out from said first database a content requested by the user from the transmitted content list and distributing the content to said portable terminal,
   a second database in which the personal information is registered, and
   personal information registering means for registering the personal information received from said portable terminal in said second database in relation to the specifying information, and
   upon receiving the content distribution request from said portable terminal, said content distribution means checks on the basis of the specifying information whether the personal information about the requested content has already been registered in said second database, and if the personal information has been registered, distributes the personal information to said portable terminal together with the requested content.

3. A system according to claim 2, wherein:
   said position information acquisition means comprises GPS receiving means for receiving a GPS (Global Positioning System) signal from a GPS satellite and obtaining latitude and longitude information, and
   said area specifying means specifies the area on the basis of the latitude and longitude information output from said GPS receiving means.

4. A system according to claim 2, wherein:
   said system further comprises a base station which communicates with said portable terminal by radio and whose installation position including a latitude and longitude is known in advance, said position information acquisition means acquires the latitude and longitude information from said base station through said radio communication means, and said area specifying means specifies the area on the basis of the latitude and longitude information of said base station output from said position information acquisition means.

5. A system according to claim 2, wherein:

said system further comprises a base station which communicates with said portable terminal by radio and whose installation position including a latitude and longitude is known in advance, said position information acquisition means comprises GPS receiving means for receiving a GPS signal indicating latitude and longitude information from a GPS satellite and correcting the received latitude and longitude information on the basis of the latitude and longitude information of said base station, which is acquired through said radio communication means, and said information center specifies the area on the basis of the corrected latitude and longitude information output from said GPS receiving means.

6. A system according to claim 2, wherein:

said information center comprises a third database in which authentication information that authenticates the user of said portable terminal is registered in advance, said portable terminal comprises authentication data input means for inputting authentication data of the user in sending the content distribution request to said information center, and said information center checks whether the authentication data output from said authentication data input means matches the authentication information registered in said third database, and only when the authentication data matches the authentication information, distributes the requested content to said portable terminal.

7. A system according to claim 2, wherein when information of the content registered in said first database has been changed, said content distribution means adds information representing the information change to at least one of the content list related to the area specified by said area specifying means and the content requested by the user from the content list, which are read out from said first database, and transmits the information to said portable terminal, wherein the information center deletes the personal information from the first database based on a delete command output by the portable terminal to the center, the delete command including the specific one of the one or more URLs for which the personal information is to be deleted.

8. A system according to claim 1, further comprising a camera, wherein the personal information includes image information, the personal information being inputted by way of said portable terminal and stored in digital form in a database at said information center, together with the specific one of the one or more URLs, and wherein the personal information further includes speech data that corresponds to speech made by the user and that is stored in digital form in the database.

9. A system according to claim 1, further comprising:

switch means for switching, based on a command by the user, the display of said portable terminal from displaying a content list to displaying said content update information, and vice versa.

10. An information distribution method of distributing information between an information center in which a plurality of contents are registered in advance and a portable terminal connected to the information center through a network, the method comprising:

a first step of causing the portable terminal to send a content distribution request to the information center;

a second step of causing the information center to distribute a requested content to the portable terminal in response to the content distribution request, the requested content corresponding to one or more URLs of a respective one or more Internet web sites accessible by the information center;

a third step of causing the portable terminal to transmit to the information center personal information of a user, which is input in association with the content distributed from the information center, together with specifying information that specifies the distributed content, the specifying information corresponding to a specific one of the one or more URLs of a specific one of the one or more Internet web sites for which the personal information is pertinent to; and a fourth step of causing the information center to register the received personal information and specifying information in relation to each other, wherein the second step comprises a fifth step of, when the content distribution request is received from the portable terminal, and when the personal information about the requested content has already been registered, causing the information center to distribute the personal information to the portable terminal together with the requested content, wherein the received personal information is only provided by said information center to said portable terminal that supplied said personal information, when said portable terminal later accesses the specific one of the one or more URLs, and wherein the received personal information provided by said portable terminal to said information center is not provided to other portable terminals that are capable of accessing said information center, wherein both a content list and content update information that includes said personal information related to one or more items of the content list are simultaneously displayed on a display of the portable terminal, upon selection of the one or more items of the content list by the user.

11. A method according to claim 10, wherein the method further comprises the steps of:

causing the portable terminal to send to the information center the content distribution request added with acquired current position information of the portable terminal, and causing the information center to transmit to the portable terminal a list of contents related to an area specified on the basis of the transmitted current position information of the portable terminal from a first database in which a plurality of contents having different pieces of information are registered for each of a plurality of areas defined by dividing a predetermined region, the first step comprises the step of causing the portable terminal to request the information center to distribute a content designated by the user from the transmitted content list, the second step comprises the step of causing the information center to read out the requested content from the first database and distributing the content to the portable terminal, the third step comprises the step of causing the portable terminal to transmit the personal information input in related to the distributed content to the information center together with the specifying information that specifies the distributed content, the fourth step comprises the step of causing the information center to register the transmitted personal information and specifying information in a second database in related to each other, and the fifth step comprises the steps of:

causing the information center to, upon receiving the content distribution request, check on the basis of the specifying information whether the personal information about the requested content has been registered in the second database, and if the personal information has been registered, causing the information center to distribute the personal information to the portable terminal together with the requested content.

12. A method according to claim 11, further comprising the step of, when information of the content registered in the first database has been changed, adding information representing the information change to at least one of the content list related to the specified area and the content requested by the user from the content list, which are read out from the first database, wherein the information center deletes the personal information from the first database based on a delete command output by the portable terminal to the center, the delete command including the specific one of the one or more URLs for which the personal information is to be deleted.

13. A method according to claim 10, wherein the personal information includes image information, the personal information being inputted by way of said portable terminal and stored in digital form in a database at said information center, together with the specific one of the one or more URLs, and wherein the personal information further includes speech data that corresponds to speech made by the user and that is stored in digital form in the database.

14. A recording medium which records a program that executes the procedure of distributing information between an information center in which a plurality of contents are registered in advance and a portable terminal connected to the information center through a network, wherein the program comprises a program which executes:

a first procedure of causing the portable terminal to send a content distribution request to the information center, a second procedure of causing the information center to distribute a requested content to the portable terminal in response to the content distribution request, the requested content corresponding to one or more URLs of a respective one or more Internet web sites accessible by the information center, a third procedure of causing the portable terminal to transmit to the information center personal information of a user, which is input in association with the content distributed from the information center, together with specifying information that specifies the distributed content, the specifying information corresponding to a specific one of the one or more URLs of a specific one of the one or more Internet web sites for which the personal information is pertinent to, and a fourth procedure of causing the information center to register the received personal information and specifying information in relation to each other, and the second procedure comprises a fifth procedure of, when the content distribution request is received from the portable terminal, and when the personal information about the requested distributed content has already been registered, causing the information center to distribute the personal information to the portable terminal together with the distributed content, wherein the received personal information is only provided by said information center to said portable terminal that supplied said personal information, when said portable terminal later accesses the specific one of the one or more URLs, and wherein the received personal information provided by said portable terminal to said information center is not provided to other portable terminals that are capable of accessing said information centers, wherein both a content list and content update information that includes said personal information related to one or more items of the content list are simultaneously displayed on a display of the portable terminal, upon selection of the one or more items of the content list by the user.

15. A medium according to claim 14, wherein the program further comprises a program which execute the procedures of:

causing the portable terminal to send to the information center the content distribution request added with acquired current position information of the portable terminal, and causing the information center to transmit to the portable terminal a list of contents related to an area specified on the basis of the transmitted current position information of the portable terminal from a first database in which a plurality of contents are registered for each of a plurality of areas defined by dividing a predetermined region, the first procedure comprises the procedure of causing the portable terminal to request the information center to distribute a content designated from the transmitted content list, the second procedure comprises the procedure of causing the information center to read out the requested content from the first database and distributing the content to the portable terminal, the third procedure comprises the procedure of causing the portable terminal to transmit the user's personal information input in related to the distributed content to the information center together with the specifying information that specifies the distributed content, the fourth procedure comprises the procedure of causing the information center to register the received personal information and specifying information in a second database in related to each other, and the fifth procedure comprises the procedures of:

causing the information center to, upon receiving the content distribution request, check on the basis of the specifying information whether the personal information about the requested content has been registered in the second database, and if the personal information has been registered, causing the information center to distribute the personal information to the portable terminal together with the requested content.

16. A medium according to claim 15, further comprising the procedure of, when information of the content registered in the first database has been changed, adding information representing the information change to at least one of the content list related to the specified area and the content requested by the user from the content list, which are read out from the first database,
wherein the information center deletes the personal information from the first database based on a delete command output by the portable terminal to the center, the delete command including the specific one of the one or more URLs for which the personal information is to be deleted.

17. An information center in which a plurality of contents are registered in advance and which distributes a requested content to a portable terminal connected through a network in response to a content distribution request from the portable terminal, the information center comprising:
registering means for registering user's personal information about the content distributed from said information center in response to the content distribution request received from the portable terminal and specifying information that specifies the distributed content in relation to each other, the specifying information corresponding to a specific one of the one or more URLs of a specific one of the one or more Internet web sites for which the personal information is pertinent to; and
distribution means for, when the content distribution request is received from the portable terminal, and the personal information about the requested distributed content has been registered in a database, distributing the personal information to the portable terminal together with the requested content, and
wherein the received personal information is only provided by said information center to said portable terminal that supplied said personal information, when said portable terminal later accesses the specific one of the one or more URLs, and wherein the received personal information provided by said portable terminal to said information center is not provided to other portable terminals that are capable of accessing said information center,
wherein both a content list and content update information that includes said personal information related to one or more items of the content list are stored at said information center and are simultaneously displayed on a display of said portable terminal, upon selection of the one or more items of the content list by the user.

18. A center according to claim 17, wherein
said information center further comprises:
a first database in which a plurality of contents are registered for each of a plurality of areas which are defined by dividing a predetermined region,
area specifying means for specifying an area where the portable terminal is currently located from the plurality of areas on the basis of current position information provided from the portable terminal, and
a second database in which the personal information is registered,
said distribution means comprises content distribution means for reading out a list of contents related to the area specified by said area specifying means from said first database and transmitting the list to the portable terminal, and reading out from said first database a content requested by the user from the transmitted content list and distributing the content to the portable terminal,
said registering means comprises personal information registering means for registering the personal information received from the portable terminal in said second database in relation to the specifying information, and
upon receiving the content distribution request from the portable terminal, said content distribution means checks on the basis of the specifying information whether the personal information about the requested content has been registered in said second database, and if the personal information has been registered, distributes the personal information to the portable terminal together with the requested content.

19. A center according to claim 18, wherein when information of the content registered in said first database has been changed, said content distribution means adds information representing the information change to one of the content list related to the area specified by said area specifying means and the content requested by the user from the content list, which are read out from said first database, and transmits the information,
wherein the center deletes the personal information from the first database based on a delete command output by the portable terminal to the center, the delete command including the specific one of the one or more URLs for which the personal information is to be deleted.

20. An information distribution method of, in an information center in which a plurality of contents are registered in advance, distributing a requested content to a portable terminal connected through a network in response to a content distribution request from the portable terminal, the information distribution method comprising:
a first step of registering user's personal information about the content distributed from the information center in response to the content distribution request received from the portable terminal and specifying information that specifies the distributed content in relation to each other, the specifying information corresponding to a specific one of the one or more URLs of a specific one of the one or more Internet web sites for which the personal information is pertinent to; and
a second step of, when the content distribution request is received from the portable terminal, and the personal information about the requested distributed content has been registered in a database, distributing the personal information to the portable terminal together with the requested content, and
wherein the received personal information is only provided by said information center to said portable terminal that supplied said personal information, when said portable terminal later accesses the specific one of the one or more URLs, and wherein the received personal information provided by said portable terminal to said information center is not provided to other portable terminals that are capable of accessing said information centers,
wherein both a content list and content update information that includes said personal information related to one or more items of the content list are stored at said information center and are simultaneously displayed on a display of said portable terminal, upon selection of the one or more items of the content list by the user.

21. A method according to claim 20, wherein said method further comprises:
a third step of specifying an area where the portable terminal is currently located from a plurality of areas on the basis of current position information provided from the portable terminal,
the first step comprises the personal information registering means of registering the personal information received from the portable terminal in a second database in relation to the specifying information,
the second step comprises the content distribution step of reading out a list of contents related to the specified area from a first database in which a plurality of contents are registered for each of a plurality of areas which are defined by dividing a predetermined region and transmitting the list to the portable terminal, and reading out from the first database a content requested by the user from the transmitted content list and distributing the content to the portable terminal, and
the content distribution step comprises the steps of:
upon receiving the content distribution request from the portable terminal, checking on the basis of the specifying information whether the personal information about the requested content has been registered in the second database, and
if the personal information has been registered, distributing the personal information to the portable terminal together with the requested content.

22. A method according to claim 21, wherein the content distribution step comprises the step of, when information of the content registered in the first database has been changed, adding information representing the information change to at least one of the content list related to the specified area and the content requested by the user from the content list, which are read out from the first database,
the method further comprising:
deleting the personal information from the first database based on a delete command output by the portable terminal to the information center, the delete command including the specific one of the one or more URLs for which the personal information is to be deleted.

23. A method according to claim 20, further comprising:
switching, based on a command by the user, the display of said portable terminal from displaying a content list to displaying said content update information, and vice versa.

24. A recording medium which records a program that executes the procedure of, in an information center in which a plurality of contents are registered in advance, distributing a requested content to a portable terminal connected through a network in response to a content distribution request from the portable terminal, wherein the program comprises a program which executes:
a first procedure of registering user's personal information about the content distributed from the information center in response to the content distribution request received from the portable terminal and specifying information that specifies the distributed content in relation to each other, the specifying information corresponding to a specific one of the one or more URLs of a specific one of the one or more Internet web sites for which the personal information is pertinent to, and
a second procedure of, when the content distribution request is received from the portable terminal, and the personal information about the requested distributed content has been registered in a database, distributing the personal information to the portable terminal together with the requested content, and
wherein the received personal information is only provided by said information center to said portable terminal that supplied said personal information, when said portable terminal later accesses the specific one of the one or more URLs, and wherein the received personal information provided by said portable terminal to said information center is not provided to other portable terminals that are capable of accessing said information center.

25. A medium according to claim 24, wherein the program further comprises a program which execute the third procedures specifying an area where the portable terminal is currently located from a plurality of areas on the basis of current position information provided from the portable terminal,
the first procedure comprises the personal information registering procedure of registering the personal information received from the portable terminal in a second database in relation to the specifying information,
the second procedure comprises the content distribution procedure of reading out a list of contents related to the specified area from a first database in which a plurality of contents are registered for each of a plurality of areas which are defined by dividing a predetermined region and transmitting the list to the portable terminal, and reading out from the first database a content requested by the user from the transmitted content list and distributing the content to the portable terminal, and
the content distribution procedure comprises the procedures of:
upon receiving the content distribution request from the portable terminal, checking on the basis of the specifying information whether the personal information about the requested content has been registered in the second database, and
if the personal information has been registered, distributing the personal information to the portable terminal together with the requested content.

26. A medium according to claim 25, wherein the content distribution procedure comprises the procedure of, when information of the content registered in the first database has been changed, adding information representing the information change to at least one of the content list related to the specified area and the content requested by the user from the content list, which are read out from the first database,
the method further comprising:
deleting the personal information from the first database based on a delete command output by the portable terminal to the information center, the delete command including the specific one of the one or more URLs for which the personal information is to be deleted.

* * * * *